United States Patent [19]

Krutki et al.

[11] Patent Number: 5,246,975
[45] Date of Patent: Sep. 21, 1993

[54] BLOWING AGENTS

[75] Inventors: Peter Krutki, Warrington; Andrew M. Connell, Bury, both of England

[73] Assignee: Schering Industrial Products Limited, England

[21] Appl. No.: 932,766

[22] Filed: Aug. 20, 1992

Related U.S. Application Data

[62] Division of Ser. No. 521,607, May 10, 1990, abandoned.

[30] Foreign Application Priority Data

May 11, 1989 [GB] United Kingdom ............... 8910867

[51] Int. Cl.$^5$ ............................................. C08J 9/10
[52] U.S. Cl. ............................ 521/85; 252/182.34; 521/88; 521/89; 521/94; 521/95; 521/96; 521/143; 521/150
[58] Field of Search ............ 252/182.34; 521/85, 521/94, 89, 88, 95, 96, 143, 150

[56] References Cited

U.S. PATENT DOCUMENTS

| | | |
|---|---|---|
| 4,870,114 | 9/1989 | Hashimoto et al. ............... 521/96 |
| 4,916,165 | 4/1990 | Hashimoto et al. ............... 521/96 |
| 4,942,069 | 7/1990 | Keogh ............................. 521/145 |

Primary Examiner—Morton Foelak
Attorney, Agent, or Firm—Ostrolenk, Faber, Gerb & Soffen

[57] ABSTRACT

Blowing agent compositions for use in the production of peroxide cross-linked polyethylene foams. The improved properties and a process for the production of such foams are described.

16 Claims, No Drawings

BLOWING AGENTS

This is a division of application Ser. No. 07/521,607, filed May 10, 1990, now abandoned.

This invention concerns blowing agent compositions for use in the production of peroxide crosslinked polyethylene foams (by which term is meant both ethylene homopolymers and ethylene copolymers) having improved properties, and a process for the production of such foams.

The usual process for the manufacture of peroxide crosslinked polyethylene foams comprises carefully heating, and extruding into a suitable profile, a composition of the polymer together with a crosslinking agent, e.g. dicumyl peroxide, and a chemical blowing agent (this being a compound which decomposes on heating to liberate the gases which cause the foaming), and then heating the extruded composition further in order to foam or expand it. The gases evolved by the blowing agent will only be efficiently retained in the polymer, and thus give good quality, low density foams, if the rate of decomposition of the blowing agent and the crosslinking reaction itself are synchronised at the temperatures employed. If the blowing agent decomposes too soon, the gases evolved escape from the polymer and, if the crosslinking proceeds too quickly, or even in the extrusion phase as is quite possible, expansion will be insufficient, and poor or non-existent cell structure will result.

Considerable advantages exist in the use of relatively low expansion temperatures, since these avoid the decomposition of the polymer, leading to whiter foamed products. There are also savings in production costs. However, the lower the expansion temperature, the closer it becomes to the extrusion temperature, and the greater is the likelihood of premature crosslinking occurring during that phase. Also, at the desired temperatures, the blowing agent must usually be used in conjunction with an activator which causes it to decompose sufficiently.

The use of azodicarbonamide as a chemical blowing agent in the production of polyethylene foams is well known, as also is the use of this compound in combination with an activator, e.g. a zinc compound, which modifies the temperature and rate at which the compound liberates the foam-forming gases.

It is also well known to use a coagent in conjunction with the crosslinking agent, e.g. a polyfunctional unsaturated compound, which increases the rate of peroxide crosslinking so as to balance the rate of crosslinking with the temperature and rate at which the activated blowing agent decomposes during the expansion phase. Such coagents are usually polymerisable polyfunctional unsaturated compounds such as acrylates or methacrylates of polyhydric alcohols or allyl compounds. Unfortunately, although the natural desire is to use a highly active coagent, for example zinc diacrylate or trimethylolpropane triacrylate, when such compounds are used under normal extrusion conditions, premature crosslinking often occurs, with the associated disadvantages mentioned above. On the other hand, the use of less active coagents such as methacrylates leads to inadequate crosslinking at the gas liberation temperature, and consequent sticking of the foam to the production surfaces, pin-holed surfaces, coarse cell structure, and inadequate gas retention in the foam.

Most conventional coagents are also liquids at normal temperatures or are low-melting, waxy solids, which are difficult to blend with other ingredients, giving formulations which are not free-flowing and which are generally difficult to disperse in the polymer. An attempt to overcome this problem by adsorbing the coagent on silica has not been wholly successful since it is found that this reduces the efficacy of the formulation.

The compound m-phenylenebismaleimide, which is a high melting-point solid, is known as a peroxide crosslinking agent in the production of non-foamed rubbers and also as a coagent in the production of non-foamed peroxide crosslinked chlorosulphonated polyethylene, but this compound is far too reactive to be employed as a coagent in the preparation of polyethylene foams, giving premature crosslinking, and leading to foams having undesirable properties.

We have now found that it is surprisingly possible to employ compounds containing two or more maleimide (1H-pyrrole-2,5-dione) groups as coagents in the production of polyethylene foams, provided that certain other compounds are also present. These other compounds not only prevent premature crosslinking during the extrusion phase, but also and surprisingly enable the production of foams having fine, uniform cell structures, with pinholefree, non-sticky surfaces during the expansion phase.

Accordingly, in one aspect, this invention provides a process for the production of a peroxide crosslinked polyethylene foam in which an ethylene homo- or co-polymer is heated with a peroxide crosslinking agent in the presence of a suitable amount of a blowing agent composition which comprises azodicarbonamide, one or more compounds containing two or more maleimide groups, and a free-radical scavenging compound, to give the desired foam product.

In another aspect, the invention provides the use, in combination, of azodicarbonamide, one or more compounds containing two or more maleimide groups, and a free-radical scavenging compound in the production of peroxide crosslinked ethylene homo- or co-polymer foams.

In another aspect, the invention provides a coagent composition for use in the peroxide crosslinking of ethylene homo- or co-polymer foams, which comprises one or more compounds containing two or more maleimide groups, and a free-radical scavenging compound.

In a further aspect, the invention provides a blowing agent composition which comprises azodicarbonamide, one or more compounds containing two or more maleimide groups, and a free-radical scavenging compound.

The free-radical scavenging compound we have found slows the activity of the the maleimide compound sufficiently and reproducibly so that by suitable adjustment of the amounts of each employed, premature crosslinking during the extrusion phase can be avoided. However, and quite surprisingly, we have found that this inhibition of crosslinking is not carried over into the expansion phase, where it would of course be totally undesirable. Thus, good quality peroxide crosslinked polyethylene foams may be produced.

The blowing agent composition preferably contains from 80 to 99 % by weight of azodicarbonamide, especially from 90 to 98 % by weight thereof.

The blowing agent composition also preferably contains an activator for the azodicarbonamide, for example a zinc compound, e.g. zinc oxide, zinc carbonate, zinc laurate or diamminozinc diisocyanate, or a mixture of such compounds. Such an activator is preferably present in the composition in an amount of from 0.1 to 0% by weight, especially from 1 to 5% by weight.

The compound containing two or more maleimide groups is preferably N,N'-p,p'-diphenylmethanebismaleimide, N,N'-m-phenylenebismaleimide, N,N'-p-phenylenebismaleimide, N,N'-m-tolylenebismaleimide, 1,1'-(oxydi-4,1-phenylene)bis[1H-pyrrole-2,5-dione], 1,1'-(2,2,4-trimethyl-1,6-hexanediyl)bis[1H-pyrrole-2,5-dione], 1,1',1''-(1,3,5-benzenetriyl)tris[1H-pyrrole-2,5-dione] or 1,1'-(1,3-phenylene)(bis[3-methyl-1H-pyrrole-2,5-dione]. A particularly preferred such compound is N,N'-m-phenylenebismaleimide.

The compound containing two or more maleimide groups is preferably present in the blowing agent composition in an amount of from 0.1 to 10% by weight, especially from 0.2 to 5% by weight.

The free-radical scavenging compound employed is preferably an antioxidant compound, particularly a phenol having 1 to 4 phenolically connected OH groups (e.g. hydroquinone or 4-methoxyphenol), especially a sterically-hindered phenol (e.g. bisphenol A, i.e. 2,2-bis(4-hydroxyphenyl)propane, Irganox 1010, i.e. pentaerythrityl-tetrakis-3-(3,5-di-t-butyl-4-hydroxyphenyl)-propionate, Permanax WSP, i.e. 2,2'-methylenebis[6-(1-methylcyclohexyl)-p-cresol or Topanol CA, i.e. 1,1,3-tris(2-methyl-4-hydroxy-5-t-butylphenyl)butane), a phenylenediamine (e.g. N-isopropyl-N'-phenyl-p-phenylenediamine), a trimethylquinoline derivative (e.g. polymeric dihydrotrimethylquinoline), a sulphide (e.g. dilaurylthiodipropionate), or a phosphite (e.g. tris(-nonylphenyl)phosphite). The free-radical scavenging compound may alternatively be, for example, sulphur, triallylcyanurate or triallylisocyanurate. It is preferably present in the blowing agent composition in an amount of from 0.02 to 3% by weight.

In the production of polyethylene foams, the blowing agent composition is preferably employed in an amount of from 5 to 25 parts by weight per 100 parts by weight of the ethylene homo- or co-polymer.

The invention is illustrated by the following Examples:

EXAMPLES 1-5

The following ingredients were blended together in a Papenmeier blender (all figures being wt %):

| Ingredient | Ex 1 | Ex 2 | Ex 3 | Ex 4 | Ex 5 |
| --- | --- | --- | --- | --- | --- |
| azodicarbonamide | 96.2 | 98.0 | 94.0 | 96.0 | 97.0 |
| zinc laurate | 1.5 | 1.0 | 1.0 | 1.5 | 1.0 |
| basic zinc carbonate | 1.0 | — | — | — | — |
| zinc oxide | — | 0.5 | 1.5 | 1.0 | 1.0 |
| N,N'-m-phenylenebismaleimide | 1.0 | 0.4 | — | — | 0.9 |
| N,N'-p,p'-diphenylmethanebismaleimide | — | — | 3.0 | 1.2 | — |
| bisphenol A | 0.3 | — | — | — | — |
| hydroquinone | — | 0.1 | — | — | — |
| N-isopropyl-N'-phenyl-p-phenylenediamine | — | — | 0.5 | — | — |
| triallylcyanurate | — | — | — | 0.3 | — |
| sulphur | — | — | — | — | 0.1 |

The blends were all free-flowing. Master batches were prepared by mixing 200 parts by weight of low-density polyethylene with 96 parts by weight of the above compositions and 7.5 parts by weight of dicumyl peroxide (40% active). These were then granulated, blended with 400 parts by weight of low density polyethylene, and extruded on a 32 mm screw extruder, die setting 115° C., to obtain approximately 3 mm thick sheet. Sheet samples were then expanded in an air-circulated oven at 95° C. for 6 minutes. The foams were all found to have fine, uniform cell structures, with pinhole-free, non-sticky surfaces.

EXAMPLE 6

The following ingredients were blended together in a Papenmeier blender (all figures being wt %):

| Ingredient | Parts by weight |
| --- | --- |
| azodicarbonamide | 96.8 |
| zinc laurate | 1.5 |
| zinc oxide | 0.8 |
| N,N'-m-phenylenebismaleimide | 0.8 |
| Irganox 1010 | 0.1 |

This blend was also free-flowing. Masterbatch concentrates were prepared containing low density polyethylene (200 parts by weight), dicumyl peroxide (40% (7.5 parts by weight), and the above blend (30-120 parts by weight). These masterbatch concentrates were compounded on a 2-roll mill, granulated, and further blended with 400 parts by weight of low density polyethylene to give compositions containing 100 parts by weight of low density polyethylene, 0.5 parts by weight of dicumyl peroxide, and 5, 10, 15 and 20 parts by weight respectively of the above blend.

The above compositions were extruded into sheet form on a 32 mm screw extruder at 40 rpm at a temperature of 110°-115° C., leading to a maximum melt temperature of about 130° C. The sheet samples were then expanded on a fine mesh support in a laboratory fan-assisted oven set at an air temperature of 95° C. All the foam samples produced had uniform cell structures, and were of high quality, having pinhole-free, non-sticky surfaces. Foam densities obtained at the various contents of the blend in the compositions were as follows:

| Content (Parts by weight) | Density (Kg/m³) |
| --- | --- |
| 5 | 90.2 |
| 10 | 46.1 |
| 15 | 33.8 |
| 20 | 25.6 |

EXAMPLES 7-12

The following tests compare the effect of adding a radical scavenger to compositions containing various highly active coagents, all of which otherwise suffer from premature crosslinking during processing.

| Blowing Agent Composition | EX 7 | EX 8 | EX 9 | EX 10 | EX 11 | EX 12 |
| --- | --- | --- | --- | --- | --- | --- |
| Azodicarbonamide | 92.5 | 92.05 | 90.5 | 90.35 | 96.7 | 96.55 |
| Zinc Oxide | 5.0 | 5.0 | 5.0 | 5.0 | 0.8 | 0.8 |
| Zinc Laurate | 1.5 | 1.5 | 1.5 | 1.5 | 1.5 | 1.5 |
| m-Phenylenebis-malemide | 1.0 | 1.0 | — | — | — | — |
| Trimethylolpropane triacrylate | — | — | 3.0 | 3.0 | — | — |
| Zinc Diacrylate | — | — | — | — | 1.0 | 1.0 |
| Irganox 1010 | — | 0.45 | — | 0.15 | — | 0.15 |

The above compositions (15 parts by weight) were each compounded as in Example 6 with 100 parts be weight of low density polyethylene and 0.5 parts by weight of idcumyl peroxide. Results obtained on extrusion and expansion were as follows:

|       | After Extrusion | After Expansion |
|-------|-----------------|-----------------|
| EX 7  | Crosslinked     | N/A             |
| EX 8  | Non-Crosslinked | Good quality foam |
| EX 9  | Crosslinked     | N/A             |
| EX 10 | Non-Crosslinked | Sticky surface  |
| EX 11 | Crosslinked     | N/A             |
| EX 12 | Non-Crosslinked | Sticky surface  |

These results demonstrate that the radical scavenger employed is only effective to give good quality foams in Example 8, i.e. only when used in combination with the bis-maleimide coagent of the present invention. If it is omitted from formulations containing either the present bis-amleimide or the other known coagents, the result is premature crosslinking.

We claim:

1. A process for the production of a peroxide crosslinked polyethylene foam in which an ethylene homopolymer is heated with a peroxide crosslinking agent in the presence of a suitable amount of a blowing agent composition which comprises azodicarbonamide, one or more compounds containing two or more maleimide groups, and a free-radical scavenging compound, to give the desired foam product.

2. A process according to claim 1 in which the azodicarbonamide comprises from 80 to 99% by weight of the blowing agent composition.

3. A process according to claim 2 in which the azodicarbonamide comprises from 90 to 98% by weight of the blowing agent composition.

4. A process according to any of claim 1 in which the compound containing two or more maleimide groups is N,N'-m-phenylenebismaleimide, N,N'-p,p'-diphenylmethanebismaleimide, N,N'-m-phenylene bismaleimide, N,N'-p-phenylenebismaleimide, N,N'-m-tolylenebismaleimide, 1,1'-(oxydi-4,1-phenylene)-bis[1H-pytrrole-2,5-dione], 1,1'-(2,2,4-trimethyl-1,6-hexanediyl)bis[1H-pyrrole-2,5-dione],1,1',1'''-(1,3,5-benzenetriyl)tris[1 H-pyrrole-2,5-dione] or 1,1'-(1,3-phenylene)bis[3-methyl-1H-pyrrole-2,5-dione].

5. A process according to any of claim 1 in which the compound containing two or more maleimide groups comprises from 0.1 to 10 % by weight of the blowing agent composition.

6. A process according to claim 5 in which the compound containing two or more maleimide groups comprises from 0.2 to 5 % by weight of the blowing agent composition.

7. A process according to claim 1 in which the free-radical scavenging compound is hydroquinone, 4-methoxyphenol, 2,2-bis(4-hydroxyphenyl)propane, pentaerythrityltetrakis-3-(3,5-di-t-butyl-4-hydroxyphenyl)-propionate, 2,2'-methylenebis[6-(1-methylcyclo-hexyl-p-cresol, 1,1,3-tris(2-methyl-4-hydroxy-5-t-butylpheny)butane, N-isopropyl-N'-phenyl-p-phenylenediamine, polymeric dihydrotrimethylquinoline, dilaurylthiodipropionate, sulphur, tris(nonylphenyl)phosphite, triallyl isocyanurate or triallyl cyanurate.

8. A process according to claim 1 in which the free-radical scavenging compound comprises from 0.02 to 3% by weight of the blowing agent composition.

9. A process according to claim 1 in which from 5 to 25 part by weight of the blowing agent composition are employed per 100 parts by weight of the polyethylene.

10. A process according claim 4 in which the azodicarbonamide comprises from 80 to 99% by weight of the blowing agent composition.

11. A process according to claim 10 in which the azodicar bonamide comprises from 90 to 98% by weight of the blowing agent composition.

12. A process according to claim 11 in which the compound containing two or more maleimide groups comprises from 0.1 to 10% by weight of the blowing agent composition.

13. A process according to claim 12 in which the compound containing two or more maleimide groups comprises from 0.2 to 5% by weight of the blowing agent composition.

14. A process according to claim 13 in which the free-radical scavenging compound is hydroquinone, 4-methoxyphenol, 2,2-bis(4-hydroxyphenyl)propane, pentaerythrityltetrakis-3(3,5-di-t-butyl-4-hydroxyphenyl)-propionate, 2,2'-methylenebis[6-(1-methylcyclohexyl)-p-cresol, 1,1,3-tris(2-methyl-4-hydroxy-5-t-butylphenyl) butane, N-isopropyl-N'-phenyl-p-phenylenediamine, polymeric dihydrotrimethylquinoline, dilaurylthiodipropionate, sulphur, tris(nonylpheny) phosphite, trially isocyanurate or triallyl cyanurate.

15. A process according to claim 14 in which the free-radical scavenging compound comprises from 0.02 to 3% by weight of the blowing agent composition.

16. A process according to claim 15 in which from 5 to 25 part by weight of the blowing agent composition are employed per 100 parts by weight of the polyethylene.

* * * * *